US010896321B2

(12) United States Patent
Dalley, Jr. et al.

(10) Patent No.: US 10,896,321 B2
(45) Date of Patent: Jan. 19, 2021

(54) MONITORING INMATE MOVEMENT WITH FACIAL RECOGNITION

(71) Applicant: Codex Corporation, Maple Grove, MN (US)

(72) Inventors: Kenneth L. Dalley, Jr., Maple Grove, MN (US); Frank Montemorano, St. Michael, MN (US); Andrew Shaw, Maple Grove, MN (US)

(73) Assignee: Codex Corporation, Maple Grove, MN (US)

( * ) Notice: Subject to any disclaimer, the term of this patent is extended or adjusted under 35 U.S.C. 154(b) by 0 days.

(21) Appl. No.: 16/395,315

(22) Filed: Apr. 26, 2019

(65) Prior Publication Data

US 2020/0125838 A1 Apr. 23, 2020

Related U.S. Application Data

(60) Provisional application No. 62/748,050, filed on Oct. 19, 2018.

(51) Int. Cl.

| | |
|---|---|
| ***G06K 9/00*** | (2006.01) |
| ***H04N 5/18*** | (2006.01) |
| ***H04N 5/247*** | (2006.01) |
| ***H04N 7/18*** | (2006.01) |
| ***G06T 7/73*** | (2017.01) |

(Continued)

(52) U.S. Cl.

CPC ..... *G06K 9/00288* (2013.01); *G06K 9/00255* (2013.01); *G06K 9/00778* (2013.01); *G06T 7/292* (2017.01); *G06T 7/73* (2017.01); *G08B 21/22* (2013.01); *H04N 5/247* (2013.01); *H04N 7/181* (2013.01); *G06T 2207/30232* (2013.01); *G06T 2207/30242* (2013.01)

(58) Field of Classification Search

CPC ........... G06K 9/00288; G06K 9/00255; G06K 9/00778; G06T 7/292; G06T 7/73; G08B 21/22; H04N 5/247; H04N 7/181

See application file for complete search history.

(56) References Cited

U.S. PATENT DOCUMENTS

| | | | | |
|---|---|---|---|---|
| 7,920,626 | B2 * | 4/2011 | Fernandez ....... | G08B 13/19697 375/240.16 |
| 9,990,826 | B1 * | 6/2018 | Hodge .................. | G08B 21/22 |
| 2017/0220829 | A1 * | 8/2017 | Argentieri ............. | G06Q 10/06 |

(Continued)

*Primary Examiner* — Tsion B Owens

(74) *Attorney, Agent, or Firm* — Schwegman Lundberg & Woessner, P.A.

(57) ABSTRACT

The disclosure relates to systems and methods for automating offender documentation with facial or other recognition technique. A method can include generating, by cameras situated about a correctional facility, pixel data including first pixels corresponding to a face of a first offender in the correctional facility and an environment around the first offender corresponding to a location within the field of view of the camera, and providing, to a server, the pixel data from the cameras through a network connection, and receiving, from the server, an alert that, based on facial recognition and location detection analysis performed on the pixel data by the server, indicates a monitoring rule associated with the first offender is violated, an offender identification associated with the first offender, a location of the first offender in the correctional facility, and an indication of the monitoring rule violated.

20 Claims, 6 Drawing Sheets

100 102A 102B 102C 102F CAMERA CAMERA CAMERA CAMERA 110A 110B 110C 110F 105A 105B 105C 105D 102D CAMERA 110D 107 104 102E CAM DISP 110E 106 108 SERVER

(51) Int. Cl.

| | |
|---|---|
| ***G06T 7/292*** | (2017.01) |
| ***G08B 21/22*** | (2006.01) |

(56) References Cited

U.S. PATENT DOCUMENTS

2018/0300555 A1* 10/2018 Hodge ............... G06K 9/00771
2019/0297302 A1* 9/2019 Humphries ........... H04M 15/00

* cited by examiner

400

| NAME (402) | LOCATION (404) | DATE/TIME (406) | FROM (408) | TO (410) |
|---|---|---|---|---|
| OFFENDER 1 | CELL | 02/13 9:00 | N/A | N/A |
| OFFENDER 2 | REC | 02/13 19:00 | N/A | N/A |
| OFFENDER 3 | MEDICAL | 02/13 18:37 | N/A | N/A |
| OFFENDER 4 | CELL | 02/13 9:00 | N/A | N/A |
| OFFENDER 5 | LOCATION 2 | 02/13 19:07 | CAFETERIA | CELL |
| OFFENDER 6 | LUNCH | 02/13 18:57 | N/A | N/A |
| OFFENDER 7 | CELL | 02/13 9:00 | N/A | N/A |

*FIG. 4*

MONITORING INMATE MOVEMENT WITH FACIAL RECOGNITION

BACKGROUND INFORMATION

Officers at secure facilities face many challenges in monitoring the whereabouts of inmates. Such monitoring can include visual inspection and verification on a strict schedule. Such monitoring can require the Officers to have a detailed knowledge of which inmates can associate with each other, and which areas of a premises the individual inmates are permitted to occupy.

Prior solutions to monitoring the inmate movement includes using radio frequency identification (RFID) technology, sometimes in combination with radar. Through RFID transponder scans, last known whereabouts of an inmate can be determined. The radar can help indicate a direction an inmate is travelling, such as to help predict where the inmate is travelling.

The RFID technology is problematic in that it requires a transponder to be worn by the inmate. Some inmates can be hostile to wearing the transponder. Some inmates can remove the transponder, thus making the RFD technology inoperable. An improved inmate tracking technique that does not rely on inmate cooperation is desired.

BRIEF DESCRIPTION OF THE DRAWINGS

FIG. 4 illustrates a user interface, according to an example embodiment.

DETAILED DESCRIPTION

Figure 1:
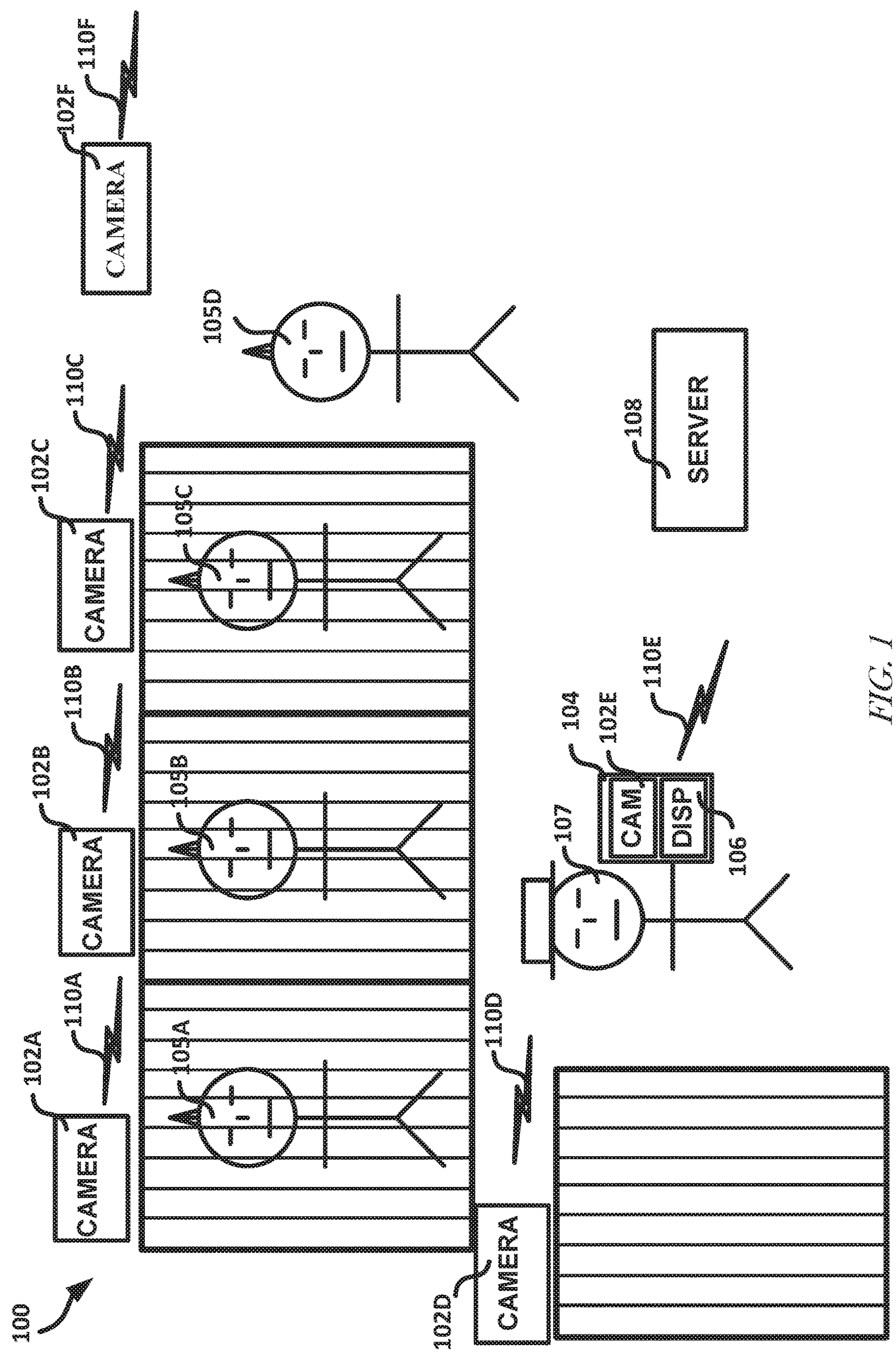
FIG. 1 illustrates a system configured for automated offender documentation, according to an example embodiment.

Various embodiments illustrated and described herein provide solutions to efficiently and accurately monitor the movement of offenders (e.g., inmates) or other correctional facility personnel. These embodiments provide one or more advantages over prior correctional facility personnel monitoring systems. The one or more advantages can include removing the requirement of the correctional facility personnel to wear a tracking device (e.g., an RFID transponder) and leveraging a security feature already present in the correctional facility (e.g., a camera) to perform the tracking and monitoring. These advantages and embodiments are described, with reference to the FIGS.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the subject matter of embodiments.

Such embodiments may be referred to, individually and/or collectively, herein by the term example or embodiment merely for convenience and without intending to limit the scope of this application to any single concept if more than one is in fact disclosed. The following description is, therefore, not to be taken in a limited sense, and the scope of inventive subject matter is defined by the appended claims.

The disclosure presents methods and apparatuses for monitoring correctional facility personnel using facial or other feature recognition. The correctional facility personnel can include an employee of the correctional facility (e.g., a corrections officer, warden, cook, nurse, janitor, maintenance personnel, information technology (IT) manager, maid, or the like), a person detained in the correctional facility (sometimes called an "inmate" or "offender" herein), a person visiting the correctional facility (e.g., inmate friend or relative), lawyer, religious figure (e.g., minister, pastor, rabbi, or the like), or other correctional facility visitor.

The feature recognition can include one or more characteristics unique to the correctional facility personnel. For example, facial features, tatoo, birthmark, hairdo, or characteristic of a visible body part (visible to the camera). The body part can include a hand, neck, or other visible body part.

A camera can include a field of view that includes a portion of a correctional facility. The camera can produce frames that include pixel data. The frames can be provided to a local or remote device that analyzes the pixel data. The analysis can include performing object recognition, facial recognition, or the like to identify an entity associated with the object or face. The identification can include comparing one or more features from the analysis to records of features of correctional facility personnel to determine an entity associated with the features.

The field of view of the camera can be static and the data from the camera can include data or metadata that indicates the camera from which the pixel data originated. In such cases, the field of view of the camera can be associated with a location in the correctional facility and a location of the entity identified in the analysis can be determined.

The field of view of a camera can be dynamic, such as if the camera is mobile. A mobile camera can be on a track, wire, part of a person, or carried by a person. In such cases, a location of the camera can be determined based on an object in the field of the camera. The object can be static in the correctional facility and associated with a location in the correctional facility. When correctional facility personnel are identified in the pixel data with the object, it can be determined that the identified correctional facility personnel is at the location associated with the object.

The frame from the camera can include an associated time or date. The time or date can be compared against a schedule for the correctional facility personnel. If the location of the personnel is not consistent with the schedule, an alert can be triggered. Regardless of whether the location is consistent with the schedule, an indication of the location of the identified personnel can be provided to correctional facility personnel.

In this way, managing information about an offender or an item associated with the offender can be automatically maintained and updated. Such a system can be advantageous when implemented in a detention center, incarceration facility, mental health facility, or any other place where location information about people or objects can be automatically tracked and managed.

Secure facility agencies face logistical, communication, and records management challenges when managing offenders (e.g., incarcerated persons). This includes processing, providing care, feeding, and collecting a wide range of information about each of the offenders including a direction the offender is moving or a location of the offender. Various embodiments illustrated and described herein include systems, methods, and software to assist in such situations. For example, typical embodiments assist in rapid recording and monitoring a wide range of data about offenders including position of the offender at a given scan time and direction the offender was traveling at a given detection time. One or more embodiments may do so in a user-friendly and efficient manner via a networked computing environment.

Custodians of persons in a facility manage many responsibilities including a significant amount of documentation in order to capture data pertinent to each person they are responsible for. Custodians (e.g., secure facility officers) may face challenges in managing persons in their facilities, such as tracking their location or threats of litigation over certain neglectful conduct. To help mitigate such risks, some embodiments herein include systems, methods, and software that provide automated data documentation indicating a location of an offender or a direction an offender is moving.

These and other advantages can be realized using one or more embodiments disclosed herein. The systems, methods, devices, and machine-readable media are now described in more detail with reference to the drawings. In the FIGS., like numerals with different suffixes indicate different instances of a similar item. For example, 102A can refer to a specific instance of item 102 and 102B refers to a different instance of the item 102.

FIG. 1 illustrates a system 100 configured for automated offender documentation, according to an example embodiment. The system 100 can include one or more cameras 102A-102F and a server 108.

The cameras 102A-102F can be mobile or fixed in the area in which they are deployed. An example of a camera 102 includes a wall-mounted camera with a stationary field of view. Such a camera 102 captures image data (pixel values) of items in the field of view of the camera. In the example of FIG. 1, the cameras 102A-102D and 102F are fixed cameras with static fields of view while the camera 102E is mobile as being part of the mobile device 104. The cameras 102A-102F can be assigned respective names (e.g., a collection of characters, letters, numbers, or other symbols) to uniquely identify the camera 102A-102F.

The cameras 102A-102D and 102F can each be assigned to a specific location. The location of the camera 102A-102D and 102F can be configured such that the cameras 102A-102D and 102F, in aggregate, can monitor a substantial portion of the area in which they are deployed for the presence of an offender 105 or correctional facility officer 107. The location of camera 102 can be determined through global positioning systems (GPS) software on the camera 102, a location code stored in a database (e.g., database), or other location software services capable of verifying the location of the camera 102.

In one or more embodiments, the cameras 102A-F can be configured to provide data within a field of view thereof. The data from the camera 102A-102F can include a unique identifier corresponding to that camera 102A-102F.

The cameras 102A-102F can each be assigned to a specific customer (e.g., an entity interested in using an automated offender documentation system). Such an assignment can help a data center manage information received from the camera 102. The camera 102A-F can be connected to a server 108 or a network 213 (see FIG. 2) through a wired or wireless connection 110A-110F. A wired connection can include an Ethernet connection or other protocol operable to connect the cameras 102A-102F to the server 108 or network 213. A wireless connection can include Wi-Fi, Bluetooth, Zigbee, or other protocol operable to wirelessly connect the cameras 102A-102F to the server 108 or network 213.

Figure 2:
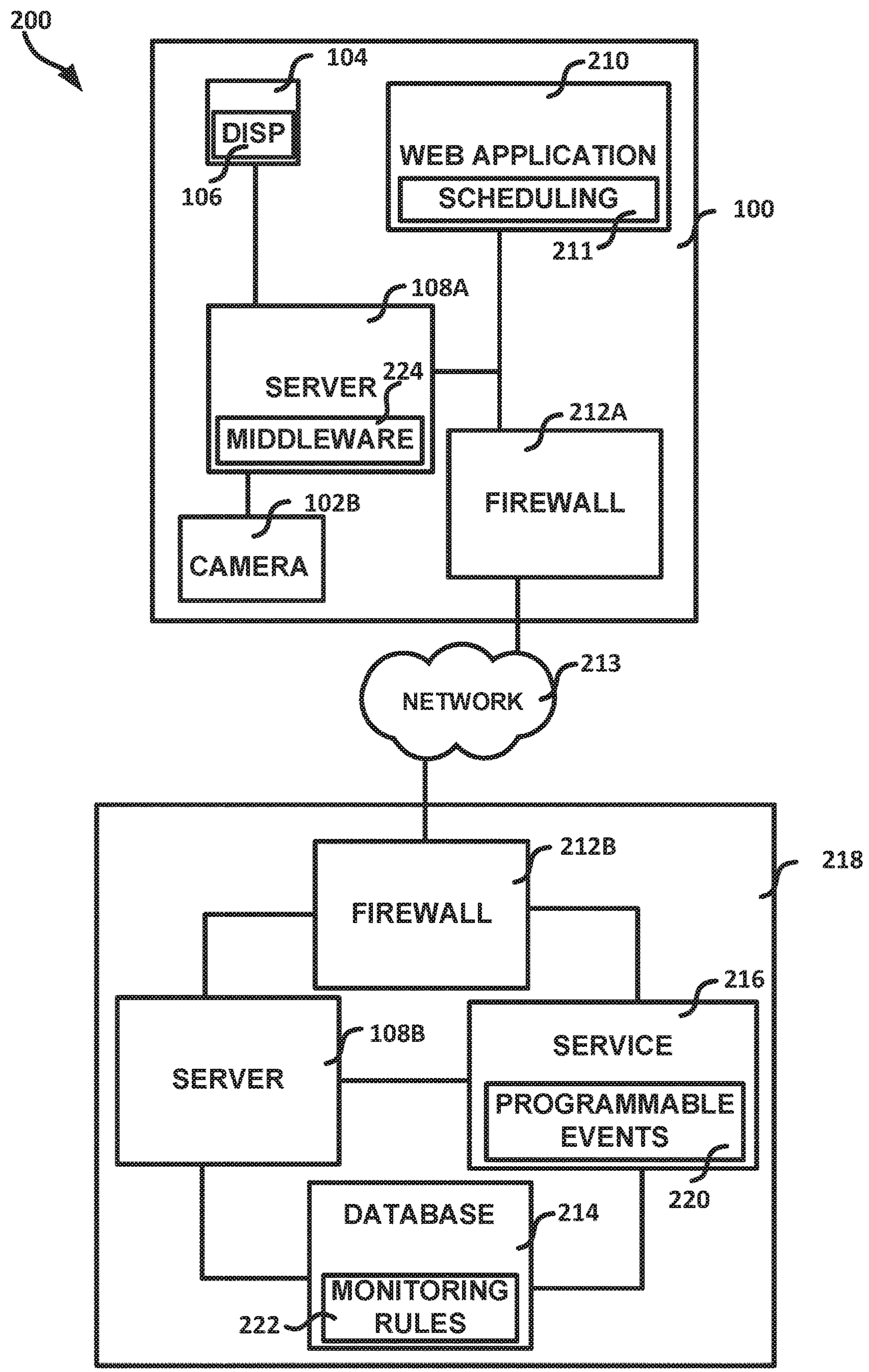
FIG. 2 illustrates, by way of example, a diagram of an embodiment of a system for correctional facility personnel management.

A camera 102A-102F can be associated with one or more programmable events 220 (see FIG. 2). A programmable event 220 can include an offender head count, location verification, or other event. For example, the cameras 102A-102F can be programmed to provide data at a particular time, such as to perform a scan. The data of the scan can be sent to the server 108 for analysis. The results of the analysis can be compared to a list of expected results. If the comparison shows an irregularity or a deviation from what is expected, a warning or alert can be sent to the proper personnel (e.g., one or more custodians responsible for managing the person associated with deviation). The proper personnel can then respond to the situation. In the case of a detention center, a warning can be sent to a detention facility officer in charge of the offender 105 corresponding to the deviation. The system can enable one or more cameras 102 to help in performing one or more pre-programmed programmable events, such as simultaneously or on a scheduled or non-scheduled basis. The programmable events can enable the cameras 102 and the system to be flexible in implementing or at least partially automating a wide range of offender documentation services. The programmable events can allow the camera 102 to help perform multiple tasks simultaneously.

FIG. 2 illustrates, by way of example, a diagram of an embodiment of a system 200 for correctional facility personnel management. The system 200 as illustrated includes a correctional facility system 100 and a backend system 218. The correctional facility system 100 includes the mobile device 102A, a web application 210, a server 108A, a camera 102B, and a firewall 212A. The backend system 218 includes a firewall 212B, server 108B, service 216, and a database 214.

One or more monitoring rules 222 can be assigned to a programmable event 220. The monitoring rules 222 can include offender 105 movement restrictions (e.g., offender 105A is not to be outside his cell at a certain time) or offender relation restrictions (e.g., offenders 105A and 105B are not to be within a certain distance of each other). The monitoring rules 222 can include an offender's housing assignment or times that an offender 105 is to be in there cell. Other user defined monitoring rules can include ensuring one or more inmates arrive to a pre-defined destination within a predefined amount of time, validating that inmates assigned to a housing unit are present (e.g., conducting a head count), or notifying system users that the service 216 detected an offender 105 or other correctional facility personnel when no such detection was expected or allowed.

Figure 3:
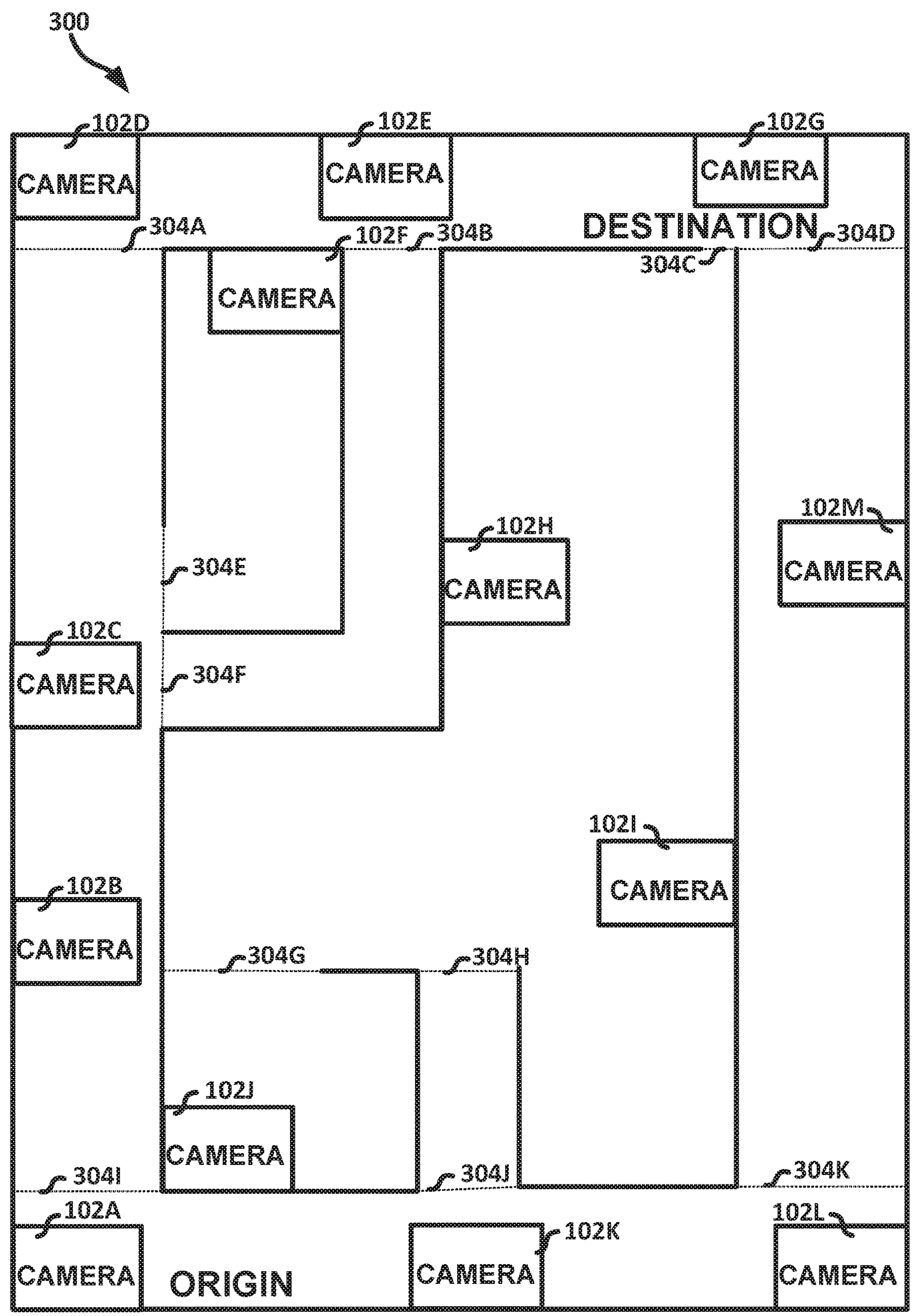
FIG. 3 illustrates a building 300 configured to monitor the movement of offenders therein.

The monitoring rules 222 can include defining an amount of time allowed for travel from a point of origin to a destination (see FIG. 3 for an example of an origin and destination). The monitoring rules 222 can include requiring one or more cameras 102 to provide frames with an offender 105 therein while the offender 105 is en route to the destination. The camera 102 can be caused to provide pixel data within a window of time after the offender 105 has left the point of origin. For example, the camera 102 can be configured to generate pixel data associated with the travelling offender 105 for less than one minute, one minute, two minutes, five minutes, sometime therebetween or a greater amount of time after the offender 105 has left the point of origin.

The monitoring rules 222 can include a capacity limitation which defines a maximum number of offenders that can be within a certain room or area at a given time. If the capacity limitation is exceeded, an alert can be communicated to appropriate personnel. The monitoring rules can include ensuring that offenders 105 en route to a common destination do not have a keep separate restriction.

User defined processes can be assigned to a programmable event 220. User defined processes can include, for example, that a service 216 can search for predefined restrictions that might preclude an inmate from being able to enter a certain room or area or that two or more inmates are not allowed to associate with each other (e.g., be within the same room or area of the facility). The user defined processes can validate that a direction an inmate was detected walking is acceptable. This can be accomplished using the frame data from the camera 102. The user defined processes can include a user causing a camera 102 to generate pixel data to be used to scan for an offender 105 in a specific location (e.g., a multi-purpose room, such as a rec room, a holding cell, cafeteria, a visitation room, a private room, or the like).

The user defined processes can include scheduled or non-scheduled offender 105 movements with destinations. For example, a user can define that an offender 105 is to get medical attention and that the offender is to travel to the health care area of the correctional facility. The user defined processes can be created using a scheduling module 211 that can be a part of the web application or a mobile application. In some embodiments, the ability for a user to schedule offender movement can be integrated with an existing scheduling solution.

The user can initiate an offender 105 movement using the web application 210 or a mobile application on the mobile device 104. The user can have a camera of the mobile device scan the offender 105 and provide the pixel data to the backend system 218. The user can specify the destination of the offender 105 before or after the offender 105 was scanned. The system 200 can then monitor the offender's progress to the destination (e.g., "progressive validation"), such as by verifying that the offender 105 passes within range of one or more specific cameras 102 based on pixel data therefrom. A camera 102 at or near the destination can help verify the presence of the offender 105 by providing pixel data that includes the offender 105.

A monitoring rule 222 can be defined that requires a moving offender 105 to be detected by the service 216. An alert can be generated if the offender 105 is not detected within a specified period of time. Progressive validation can also include scanning for an offender 105 that is off the specified path. Scanning, as used herein, means ensuring that a camera 102 is operable and generating pixel data Δn alert can be created if the offender 105 is detected off the path. The progressive validation scheme can also include directional detection and one or more monitoring rules regarding the allowed direction of the offender 105 past the camera 102. An alert can be generated if the direction of the offender 105 is not allowed by the monitoring rules.

Progressive validation can include validating that an offender 105 is travelling along a pre-defined path by detecting one or more features (e.g., facial characteristics or other objects) corresponding to the offender 105 at a camera 102 at an intermediate location between the origin and the destination of the offender 105. In some embodiments, progressive validation can be used in only selected movements of offenders 105, such as movements to specified destinations or within a specific period of time, all offender 105 movements, all or specified movements of a specific offender 105, a combination thereof, or other movements. For example, progressive validation can be used for an offender 105 with pre-defined security restrictions or alerts, or an association with a specific monitoring rule 222 or alert that was created. Progressive validation can include verifying that one or more staff of the facility (e.g., a detention center officer) are near an offender 105 before the offender 105 is permitted to begin the movement.

Progressive validation can be performed by a user (e.g., a detention center officer 107). Such validation can occur through a user verifying, such as by manually entering into the system 100, that the offender movement occurred. Such manual validation can include entering a unique ID of the offender 105. The web application 210 can record data pertinent to location (e.g., a preprogrammed database code, a computer name through which data was entered, an Internet Protocol (IP) address associated with the computer, or the like) with a progressive validation performed by a user.

Non-scheduled movement can include one or more offenders 105 that can have the same or different destinations. An offender's destination may not always be specified by a user before offender 105 movement has begun. For example, when it is discovered that two offenders 105A-105B who are not supposed to be associating with each other are in the same room, the system 218 can issue an alert to move the offender 105 before the destination of the offender is known. In such a case, one or more cameras 102 can be forced to scan for the offender 105 and can date or time stamp the pixel data to help confirm the offender's presence at the location of the camera 102.

A user can define an arrival time or a return time for scheduled or non-scheduled movements. An arrival time can define a specified period of time in which an offender 105 should be detected at or near their destination, such as to not trigger an alert. A return time can define a specified period of time within which an offender 105 is to be detected at or near their point of origin, such as to not trigger an alert.

A user (e.g., a system administrator) can define or allow scheduled or non-scheduled offender movement to not trigger an alert. This allowance can be granted on a per movement, per offender 105, or per group of offenders. In such a configuration, an offender 105 can arrival time or return time can be authenticated late without triggering an alert. In one or more embodiments, the allowance can be granted to an offender 105 that has few, no, or only certain restrictions (e.g., monitoring rules associated with the offender 105) or offenders in good standing. A record of the late authentication can be recorded even if no alert is created. The record can include the time the offender was authenticated at the arrival, or what time the offender 105 arrived at the destination or point of origin. The record can include an indication of how late the offender 105 was in authenticating their arrival or return. The system 218 can notify one or more specified users in response to an offender 105 arriving at a destination. The notification (e.g., message) can include the date or time of arrival, a unique ID associated with the offender 105 or other information pertinent to the arrival of the offender 105.

If a camera 102 becomes inoperable (e.g., because the camera 102 failed or the offender 105 damaged it either intentionally or unintentionally) the arrival time or return time can be manually entered into the system, such as through server 108A via the mobile device 104. The record associated with such an authentication can include an indication that the authentication was done manually or the reason the authentication was done manually.

A user can predefine acceptable paths from a point of origin to a destination or for the return trip to the origin from the destination. The user can define that a camera 102 along the path associated with a moving offender 105 scan the offender 105 while en route. The predefined paths and cameras 102 to scan the offender 105 on the path can be stored in the database 214. The acceptable travel paths can be created at run-time, such as by using the web application 210. The paths can be saved into a library of predefined paths. The paths can be accessed by users with sufficient privileges to allow them to create new paths or modify existing paths. The disclosure regarding FIG. 3 describes more details regarding predefined acceptable paths. The system can notify one or more specified users in response to an offender 105 arriving at a destination.

A programmable event 220 can be associated with more than one camera 102. For example, in the example of doing a head count in a secure facility a programmable event 220 can trigger cameras 102A-102D to generate pixel data that can be used to determine the number of offenders 105 in their cell, housing unit, or some other location, such as an infirmary or recreation yard. Associating a programmable event 220 with a camera 102 can be done automatically, such as by a computer processor, or can be done manually by a user through an application configured to manage the configuration and implementation of an offender documentation system. The server 108A or 108B can instruct or poll the camera 102A-102F for collected data or the cameras 102A-F can be programmed to send the collected data to the server 108A-108B or the service 216. The data can be sent as soon as the data is collected, on a pre-determined schedule, or a combination thereof.

One or more of the cameras 102A-102F can be configured to constantly, or intermittently generate pixel data. The intermittent data collection of cameras 102 can be helpful in monitoring areas where offenders are not expected to be or in monitoring transit points to monitor the progress of offenders 105 in transit. When one of these cameras 102 detects the presence of object or entity movement, an alarm or message can be sent to the proper personnel, such as through the server 108 or the network 213. The message or alert can be a text, or other content, message to a mobile device, an email (e.g., including an attachment), or other notification.

The data sent from the cameras 102A-102F to the server 108 can be encrypted. The data from the camera 102 can be sent to a server 108 that is running middleware 224 (e.g., software that provides services to a software application beyond those available from an operating system or an application that logically and physically runs between a sender and a receiver).

In one or more embodiments, rather than using middleware 224 or calling one or more services 216 (e.g., services provided over the internet or through the network with or without the internet), the camera 102 can include one or more services, which may be in the form of an application programming interface (API), database connectivity client, or other logical element to perform the functions of the middleware 224 or the service 216. An example of a camera 102 that can be used to perform the functions of the middleware 224 or the service 216 is a smart camera, such as a camera capable of being coupled to the internee, a smart phone with a camera, or the like.

The mobile device 104 can include a user interface 106 configured to show information related to movement of an offender 105. The mobile device 104 can be configured to display, such as on user interface 106 a schedule to a user indicating when or where camera 102 scans are to occur.

The camera 102A-102F can provide data that can be used to determine the direction, velocity, or the like of an offender 105 within its field of view. These characteristics can be determined based on the pixels associated with an offender 105 in successive frames, the number of pixels consumed by the offender 105, or the like. Such information can be relayed to the server 108. The information sent to the server 108 can be accompanied by an identification of the camera 102 involved in the scan.

A monitoring rule 222 can include that the service 216 is to validate the direction the offender 105 was detected moving. When the service 216 determines that the offender 105 was moving in an unacceptable direction, a system alert can be triggered and the system 218 can make a record of the violation.

The server 108 can be configured to run a web application 210 or middleware 224 configured to implement or manage automatic offender documentation. The server 108 can receive data from the cameras 102A-102F. The data received can include a unique identification (ID) key that identifies the camera 102A-102F that sent the data. The server 108 can look up the camera ID and correlate a specific time or location with the camera 102A-102F. The server 108 can send the time, location, and camera ID data to another server 108B.

The server 108 can be part of a Local Area Network (LAN), or it can be hosted remotely. The middleware 224 that can be accessible through the server 108 can either be hosted locally (e.g., through a LAN) or remotely. The middleware 224 can send data received or modified by the server 108 or middleware 224 to a service 216.

The cameras 102 can be coupled to the server 108A such that data can be sent to the server 108A from the camera 102 and data can be sent to the camera 102 from the server 108A, The server 108A can be coupled to the web application 210, such as to host the web application 210. The server 108A can be coupled to the firewall 212A so data sent from and received at the system 100 can be protection scanned, encrypted, or decrypted.

While the server 108B, service 216, and the database 214 are depicted as individual units, they may be implemented on one or more servers. For example, the server 108B, service 216, and database 214 may all be implemented on the same server, or each may be implemented on its own server.

The web application 210 can render web pages that can provide the functionality of the service 216 to a user. The web application 210 can be hosted locally, such as on server 108A, or remotely, such as on server 108B.

The networked system can include the system 100 coupled to the system 218, such as through a network 213 (e.g., the internet). The system 218 can sometimes be referred to as being part of the "cloud". The cloud allows a user to utilize someone else's computers or storage devices over the Internet.

Such a configuration can allow the data storage for and analysis of monitoring offenders or other correctional facility personnel to be off site. The system 218 can include a firewall 212B coupled to a server 108B and a service 216. The firewall 212B can help to ensure that the data sent to the server 108B and the service 216 will not harm the server 108B or service 216. The firewall 214B can help in decrypting communications, ensuring data is sent from a permitted (registered or authenticated) sender, or the like. The server 108B can be coupled to a database 214, such that the database 214 can provide data to the server and receive data from the server 108B. The server 108B can be coupled to the service 216, such that the service 216 can provide functionality related to automated offender documentation to the server 108B. The data received at the server 108B can be used in rendering web pages to users. The database 214 can be coupled to the service 216 to provide data to the service 216 and to receive and store the results of operations performed by the service 216.

The firewalls 12A-212B can scan incoming and outgoing data for malware to help prevent a malicious attack on the system 200. The firewall 212A can encrypt data that is outgoing or decrypt data that is incoming. The encryption or decryption can be accomplished using a separate encryption or decryption module and can be incorporated at different places in the system such as on a camera 102, so as to allow encrypted data sent to be sent to the server 108B.

The service 216 can be deployed locally on the server 108B or hosted remotely. The service 216 can retrieve programmable events 220 currently assigned to a camera 102. The programmable events 220 can be stored in the database 214, on the server 108A-108B, or on the service 216. The service 216 can run processes associated with a programmable event 220. For example, the service 216 can analyze, organize, or format collected data. The analyzed, organized, or collected data can be sent to the database 214 for retention. The analysis can include comparing the data to monitoring rules 222 associated with a programmable event 220. Such comparisons can monitor compliance and detect violations of the monitoring rules 222 and an alarm, alert, or message can be sent to the proper personnel when a monitoring rule 222 has been violated.

The service 216 can correlate collected data. Correlating data can help the service 216 detect a violation of a monitoring rule 222. A correlation can be performed at an individual offender level, a block level, an entire building (e.g., secure facility, such as a detention center, mental health facility, or the like) level, or other level. For example, the service 216 can correlate all data associated with the same offender 105 or a cellblock and compare that data to the monitoring rules 222 relating to the offender 105 or the cellblock to determine if the offenders 105 comply with the monitoring rule or a violation has occurred. The service 216 can compare one offender's data to another offender's data to determine if a monitoring rule 222 violation has occurred. Such comparisons can be useful when a monitoring rule 222 states that two or more offenders are to be kept separately, not contact each other, or otherwise not associate with each other. The service 216 can be hosted locally (as shown) or can be hosted on the network 213 (e.g., cloud).

The service 216 can receive and process data from the middleware 224. The processing can include authenticating a customer name. Authenticating a customer name can be done by verifying a customer's port number in examples where a customer has been assigned a unique port number. Authenticating can also include verifying camera ID information received is consistent and assigned to that customer.

A user (e.g., an end user) can automate the running of programmable events 220 through scheduling them through the service 216. A user can manually trigger a programmable event 220 to for the service 216 to execute. The user can customize the operations performed by the service 216 in running a programmable event 220, such as through the server 108A-108B or web application 210. The service 216 can compare data received to monitoring rules 222 and determine if a monitoring has been violated. The service 216 can initiate an alert process in response to determining that a rule has been violated.

The database 214 can store monitoring rules 222 therein. The monitoring rules 222 can define the relationship between or validate the performance expectations between a programmable event 220 and an offender 105. This can include cross-referencing other monitoring rules 222 (e.g., restrictions or requirements) associated with a given offender 105. For example, an offender 105 could be restricted from moving or from entering a specific room or area of a building. The rule or restriction could be for punitive reasons, health concerns, safety concerns, or the like. For example, a monitoring rule 222 can indicate that one or more inmates are to be kept separate at all times. The monitoring rule 222 can have an associated duration in which the monitoring is valid and is to be referenced by the service 216, One or more monitoring rules 222 can be associated with a specific offender 105 such that when the offender 105 is no longer in the building, the monitoring rule 222 is no longer referenced by the service 216.

The service 216 can analyze the data received from the cameras 102 and compare results from analyzing the data (location, direction, offender ID, time, etc.) to relevant monitoring rules 222 to determine if an alert or message should be sent to the relevant personnel. If no violation is detected, the service 216 can initiate a sequence of operations (e.g., a pre-programmed sequence of operations, processes, or events) to complete. For example, the service 216 can look for a violation of a user defined process rule (e.g., an inmate is travelling the wrong direction or there are too many inmates in a specific area). The service 216 can then search for violations of monitoring rules (e.g., a first inmate cannot be in a specific area because a second inmate is already present in the area, an inmate is not allowed to be in the rec area, or other monitoring rule violation). The service 216 can then continue to perform another process (e.g., a user defined process), such as documenting the locations of inmates that are within the field of view of a camera 102. Future data received can be analyzed (e.g., compared to monitoring rules 222) in real-time to determine if an alert or message is to be sent. When the analysis is complete, the service 216 can record that the analysis was completed or results of the analysis in the database 214.

In the case of an Internet failure (e.g., the Internet is temporarily unavailable) the middleware 224 can be configured to store received data in a local memory. When Internet connectivity is restored, the received data can be sent to the service 216. Such a configuration can be helpful in embodiments that include Software as a Service (SaaS) or a remotely hosted server. The middleware 224 can be configured to determine if a monitoring rule 222 has been violated, such as when the Internet connection to the service has failed. In one or more embodiments, the middleware 224 includes a subset of all the monitoring rules 222 for a specific system. These monitoring rules 222 can be the most important rules (e.g., the rules that the user does not want violated). In one or more embodiments, the service 216 can determine if a monitoring rule 222 has been violated after it has received the relevant data.

The middleware 224 can reside on the server 108A or 108B, locally or remotely, respectively. In one or more embodiments, the middleware 224 can be hosted in a network 213 (e.g., cloud) server. Such an implementation can provide automated offender documentation to a user through a Software as a Service (SaaS) configuration. The middleware 224 can provide communication between the cameras 102A-102F and the system 218. The middleware 224 can be configured to encrypt data it receives from the camera 102 and send the encrypted data to the service 216, server 108B, or the database 214.

The database 214 can store data from the cameras 102, the service 216, the web application 210, or the server 108A-B.

FIG. 3 illustrates a building 300 configured to monitor the movement of offenders 105 therein. The building 300 can include a plurality of cameras 102A-102M. A user-defined process can indicate that an offender 105 is to travel a path from the "origin" to the "destination". One or more monitoring rules 222 associated with the user-defined process can define a path that the offender must travel to get to the destination. In this example the path is from the "origin" go past camera 102K, turn left at camera 102L, go past camera 102M, and proceed to the destination.

In this example, if any of cameras 102B-102F or 102H-102J provides data that is analyzed and determined to include a feature associated with the offender 105 during the time of the travel, then an alert can be sent to the appropriate personnel. Similarly, if data of any of the cameras 102A, 102G, and 102K-102M produces data that is analyzed and indicates the offender 105 is traveling in a direction inconsistent with the pre-defined path, an alert can be sent to the appropriate personnel.

One or more monitoring rules associated with the user-defined process can stipulate that the cameras 102K, 102M, and 102G are to provide data and that data should indicate the offender 105 is within the field of view of the camera 102 within a specified period of time. If any one of the cameras 102K, 102M, and 102G does not provide data that is analyzed and determined to include the offender 105 within the specified period of time, then an alert can be sent to the appropriate personnel. The data from the camera 102 can be used to determine the number of offenders 105 passing by and the IDs of the offenders 105. This data can be used to determine if personnel (e.g., personnel defined by the user-defined process required to accompany the offender in transit) are accompanying the offender 105 to the destination. This data can also be used to determine if the correct number of offenders 105 is in transit. If not, then an alert can be sent to the proper personnel.

Current or historical movement data can be graphically represented on an electronic map of the facility, such as the map of the facility shown in FIG. 3. Information pertinent to a movement can be overlaid at positions corresponding to where the information was collected.

Embodiments provide automation of offender and other correctional facility personnel monitoring, such as by using facial recognition, object recognition, or other feature recognition technology. The feature recognition can be implemented, at least in part, by one or more of the web application 210, middleware 224, camera 102, mobile device 104, service 216, or server 108. Facial recognition includes identifying or verifying a person from a digital image (pixel data) from a camera 102 or other video source. Facial recognition operates, generally, by comparing features of a face in an image to features in a repository (e.g., a memory, database, or the like). The features can include a texture or shape of a portion of the face.

Facial recognition techniques include feature-based techniques that extract landmarks (or features) from an image of the face. For example, the technique can analyze a relative position, size, or shape of an eye, nose, cheekbone, jaw, hairline, or the like. These features can then be compared to features extracted from other images to determine the identity of the entity associated with the face. Some techniques for face recognition extract data that is useful for face recognition and discard other data. These feature-based techniques are sometimes called geometric techniques. Other techniques can include photometric or holistic based approaches, A photometric approach distills an image into values and compares with templates to help eliminate variance. Some popular facial recognition techniques include principal component analysis using eigenfaces, linear discriminant analysis, elastic bunch group matching, hidden Markov models, multilinear subspace learning, and dynamic link matching, among others.

Other facial recognition techniques include three-dimensional (3D) recognition techniques. In embodiments, the camera 102 produce data that includes x, y, and z coordinates. Sometimes these cameras 102 are called depth cameras. The 3D data from a 3D camera can help identify distinctive features on a surface of a face. Such features can include a contour of an eye socket, shape of a nose, a chin, jawline, cheekbone, or the like. Multiple cameras 102 can be used to generate data that can be analyzed to generate 31) data.

Another feature of an entity can include a visual detail of exposed skin, such as a unique line, pattern, spot, or the like. These features are sometimes referred to as skin prints. In some embodiments, instead of pixel data, the camera 102 can produce a thermal image of an object or entity that can be analyzed in a manner similar to that produced by a color image generating camera. In some embodiments, the facial recognition technique can include a combination of existing facial recognition techniques.

Embodiments regard identification and tracking of people that frequent the correctional facility. Embodiments can use a plurality of cameras 102 (e.g., internet protocol (IP) or other internet capable cameras) that provide live video streams or other video data (e.g., securely) to the Cloud, such as through the network 213. The video data can be live video or previously captured video, such as from a fixed camera or a camera of a mobile device. The video data can be exposed to Cloud-based facial recognition software (e.g., the service 216 or the server 108). One or more databases 214 can include data of characteristics of known offenders 105, as offender images, or security-critical information about these offenders. This data can be used to help to gain positive facial recognition and inmate management automation. This automation can extend to tracking movements, monitoring recreation and meal offerings; court transports, programs attendance, and a wide range of other offender movement.

Fixed camera live feeds from a video management system can be converted to encrypted, Cloud-based video streams for analytics, such as can include machine learning. These streams can exposed to a facial recognition technique integrated with the system. Recorded video from fixed cameras or mobile devices, such as smartphones and tablets, can be uploaded to the cloud and converted to encrypted video streams that can be exposed to the facial recognition technique.

The database 214 can be populated with images and demographic information of offenders 105 from third party software, including jail, offender 105, and case management software systems. Demographic information can include height, weight, hair color, gender, tattoo information, and other (e.g., unique) physical characteristics, as well as security-critical information, such as inmate housing assignments, as well as inmate security restrictions or keep separate information that details one or more inmates to be physically separate at all times. Images and video of specific offenders 105 can be manually uploaded to the system 100 or 218 or integrated with a system 218, such as a video management system or mobile devices, aiding in ongoing machine learning to assist in increasing identification accuracy of one or more offenders. An initial image of an offender can be provided to the system 218 to aid in feature extraction. An image can be replaced after a specified period of time, such as to account for natural or other changes in a person's appearance.

One or more cameras 102 can be installed in the booking area of a correctional facility, primarily nearest the camera 102 responsible for taking inmate mugshots. This fixed camera can capture video and images uploaded to the system 200 to supplement machine-learning identification.

Fixed cameras 102 can provide a live video feed or captured video. These cameras 102 can be mounted at or near an ingress or egress of a location, such as a cellblock, pod, or housing unit location. Another camera 102 can be located on the opposite side of the ingress or egress. The video feed from one camera can capture one or more inmates' faces, converting the live video feed or recorded video to an encrypted video stream. The second camera can capture video and create a second encrypted video stream. The streams can be exposed to facial recognition software within the system 200. The system 200 can identify one or more correctional facility personnel using facial recognition, confirming both camera location and the direction of the inmate's movement based on the time and date from the first video stream and the second video stream.

The recognition technique can identify objects and location within the stream itself by reading posted signage or identifying unique objects or staff members within any of the live streams. This data can be tagged as descriptive metadata. Examples of other, not necessarily facial, features include a distinctive number on clothing (an inmate number), a tattoo, a birthmark, or the like.

As the offender 105 moves within or outside a facility, an array of cameras 102 can continue to capture the offender 105 in a live video feed or video recording, that can be converted to an encrypted video stream for facial recognition or other analysis. The system 200 can monitor the offender's identity, progression to either a known or unknown destination, and/or the total time elapsed during this movement, monitored against a configurable, preset time limit, known as the "global passing time." if the offender 105 does not arrive to a destination within the global passing time, then an audible and/or visual alarm can be triggered, such as with an auto-generated log entry and system notification pushed to system administrators via email and/or mobile device, such as a smartphone, tablet, smartwatch, or web-based application.

The camera 102 can include a 360-degree view, a fish-eye view, or other view. A digital threshold (indicative of an ingress or egress point) can be created to aid in determining an offender or staff member position relative to other ingress or egress points that may appear in view. For example, a 360-degree camera may be located in such a way that two or more rooms and an ingress or egress thereto are in view.

An offender 105 can be positively identified via facial recognition. Consider an example in which the offender 105 has just entered an attorney visitation room and adjacent to the attorney visitation room are one or more rooms also in the field of view of the camera 102. The system 200 can determine an offender's location based on a configurable, digital threshold (indicated by dotted lines 304A-304K) that can be defined by a system administrator. These digital thresholds can include an electronic, virtual overlay on the facility's physical structure. As offender's walk past or through these digital thresholds, location-based data can be auto-generated for security purposes, resulting in real-time notification sharing, as well as historical reporting purposes, placing offender's into a location based on one of these digital thresholds. Additionally, confirming the offender's location can support two-factor authentication by scanning the offender's RFID card or RFID wristband with a mobile device or fixed RFID reader in the same location as the offender 105.

In some embodiments, an offender 105 can wear an identification card or wristband that contains an image (e.g., mugshot) on their front or backsides. The identification card or wristband can also have the offender's last name or booking number, for example, that can be identified by the system 200 and associated with the offender 105.

In the event that the offender 105 is intentionally obscuring their face from camera view, or is oriented in such a way to the camera 102 that facial recognition cannot be verified or verified with a high-degree of accuracy, the system 200 can use object detection to determine identity by focusing on the RFID card or RFID wristband and machine-reading the mugshot on the inmate's credential, or reading the offender's name or booking number to ascertain identity.

If offender identification is performed via object detection, versus facial recognition, a log entry with a specialized comment or icon can be used to make the clear the method of identification performed. If object identification is used to determine offender identity repeatedly within a configurable period of time, an electronic log entry and system notification can be dispatched to a certain group of users (e.g. supervisors) or the nearest staff member to recommend two-factor offender identification for security purposes.

The system 200 can monitor movement based upon motion detection and/or a configurable, preset schedule. For example, the system 200 can refrain from monitoring motionless video for facial recognition or analytics. The system 200 can be configured to monitor only a certain subset of video feeds during lockdown hours, or times of day when little to no movement is expected.

The system 200, as previously discussed, can be combined with an RFID tagging system to create two-factor authentication (first factor is facial or object recognition and second factor is RFID). One or more RFID tags can be read and electronically associated with an offender's name within a zone, which is a configurable, digital box defined by the placement of RFID readers and/or x, y coordinates. Successfully read RFID tags associated with an offender's identity can be cross-referenced against the facial recognition system 200 analysis, such as to verify the identity.

Anomalies or exceptions, such as an RFID tag electronically associated with an offender's identity that does not match the facial recognition identity can result in a mismatch. A mismatch can cause a digital warning in the system 200 that displays the offender's RFID identity and the offender's facial recognition identity. The mismatch maintains focus on the offender's facial recognition identity whose RFID credential is not paired correctly with their facial identity via a bounding box surrounding the offender in either a live video view or recorded, on-demand view. The system 200 can operate (at the same time) to identify the location of the offender 105 whose RFD identification was detected, and the location of the offender 105 who was detected. In these circumstances, two-factor authentication can fail because an offender's RFID identification, whether an ID card or wristband, may have been stolen, swapped, or taken mistakenly for another offender's identification. The system 200 can monitor camera feeds and/or RFID read zones to identify the location of the offender 105 whose two-factor authentications failed.

The database 214 can support a library of stored images and videos of correctional officers associated with the officer's name, employee IL), or other demographic information (e.g., information that is unique alone or in aggregate). The system 200 can identify correctional officers via facial recognition in the same manner as offenders 105 are identified.

At least one camera 102 located inside and outside of a housing unit can capture video used to identify an officer 107 via facial recognition. For example, a first camera may be placed near an entrance to a housing unit, capturing either a live video feed or providing recorded video. The video can be converted to a cloud-based video stream. Facial recognition analysis can be performed (e.g., in the cloud, such as by the service 216, the server 108B, or the like) determining officer identity. Metadata from the video feed can help determine time and camera location. Other pertinent data captured in the video, such as posted signage (e.g. "Cell-block A") can be identified via object identification or an identification associated with a fixed camera at a known location. This data can act as multi-factor authentication when it comes to identifying inmates and their precise location at the time of the video record.

An interior camera 102 located inside the entrance to the housing unit can perform a similar analysis as the exterior camera. Upon confirmation of officer 107 identity via facial or other recognition, the system 200 can conclude that the officer 107 has entered the housing unit. The system 200 can determine when (about a time) an officer 107 enters a housing unit of an offender 105 of the opposite sex. A logged event can be recorded in the database 214 when this happens. This can be pertinent to complying with the Prison Rape Elimination Act (PREA).

Housing units (e.g., specified locations) of the correctional facility within the system 200 can be assigned certain designations, such as classification level (e.g., minimum security, administrative segregation, and maximum security) and gender. When the officer 107 is facially recognized by an interior camera 102 within a housing unit, then recognized by the exterior housing unit camera, the system 200 can automatically (e.g., without human interference after deployment) conclude that the officer 107 has exited the housing unit. When an officer 107 or offender 105 has crossed over from camera 1 to camera 2, or camera 2 to camera 1, this is sometimes referred to as entering or exiting a threshold (indicated by dotted lines 30413).

The system 200 can identify objects, faces, including facial or other gestures, such as when a person is smiling, angry, swinging their arm, has their arm raised, is kicking, or the like. The system 200 can determine a person's actions, or the observable actions of a group of people, such as when officers 107 or offenders 105 are running or walking. The system 200 can use machine learning (ML) or artificial intelligence (AI) to identify when observable actions may require immediate escalation. The ML or AI technique can include an edge detection primal sketch, recognition by parts, an appearance-based method, such as an edge matching technique, a divide and conquer search, a greyscale matching, a gradient matching, a histogram of respective field response, or a large model base, a feature-based technique, such as an interpretation tree, a hypothesize and test technique, a neural network (NN), such as a convolutional neural network (CNN) trained on image data, a pose consistency technique, a pose clustering technique, an invariance technique, a geometric hashing technique, a scale-invariant feature transform (SIFT), a speeded up robust features (SURF) technique, a 31) reconstruction technique, or the like. Other techniques exist and too numerous to mention here.

In a situation where more than person is identified within view, the system 200 can determine who may be an officer 107, who is an offender 105, and who is neither an officer 107 or an offender 105. The system 200 can be used to notify of officer 107 duress, also known as "man-down." The system 200 can identify and track officers 107 and monitor for dangerous situations that can arise without warning. An array of cameras can monitor staff movements throughout the correctional facility, including exterior grounds, such as recreation yards.

If the system 200 identifies the observable behavior of one or more persons, which may include threatening or violent behaviors, such as pushing, punching, kicking, fighting, falling to the ground, or the like, the system 200 can flag the feed (the video data associated with the behavior), such as by creating an electronic time and date stamp with the observed violent or dangerous behaviors transcribed in the alert, the officer 107/offender 105 in danger, camera location, and the location in which the offending behavior has been detected. This information can be disseminated to one or more staff members based on a variety of configurable routing rules, such as staff proximity closest to the dangerous event, supervisory level, etc.

The system 200 can bookmark and record the video segment that triggered the alert (in the database 214), allowing system administrators to review the entirety of the incident for legal purposes, if necessary. System administrators can also determine the retention requirements for the video, as well as safeguard access to the video for chain of custody purposes.

The system 200 can automate a formal or positive identification headcount. One or more cameras 102 can be located in an interior of a housing unit. The system 200 can be placed (e.g., manually or automatically) into a software-based headcount mode through the user interface 400 or via a scheduling component within the system 200 that places the system 200 into a headcount mode. In the headcount mode, one or more cameras 102 capture a live video feed or provide recorded video of offenders currently present in the housing unit. Video analysis may also confirm location based on video capture of any posted signage for multi-factor authentication purposes. The video streams can be converted to a cloud-based video stream format and analyzed. The analysis can include facial or other object recognition, such as to confirm the total number and identity of offenders 105 identified. A list of confirmed identities can be cross-referenced against a list of offenders 105 electronically assigned to the housing unit. This can include any offenders 105 who may be assigned to the housing unit but presently absent due to circumstances such as medical appointments, court appearances, program attendance, or work responsibilities. These types of temporary movements are also known as "out of cell movements."

The system 200 can automatically analyze identity and presence, taking into account known inmate movements or current "out of cell" movements to determine headcount accuracy. For example, if a housing unit holds 96 offenders, with four offenders currently in the infirmary and two offenders at religious services, the system 200 can determine that 90 offenders 105 are to be facially detected and recognized for the headcount. The system 200 can display or cause a device to display, on a graphical user interface, the results of the headcount, and whether any anomalies or inconsistencies may exist. If the system 200 is not able to achieve a minimum, configurable, threshold of identification accuracy (e.g. 90%, 80%, 70%, 60%, or some threshold therebetween) via facial or other recognition, the individuals that were identified with lower than threshold accuracy can be identified. The officer 107 can then further verify an offender 105 that was identified at or under this accuracy threshold, such as by scanning their RFID wristband or RFD Card.

The system 200 can be used to identify suspects in unsolved crimes. Crimes are frequently committed in which the identity of one or more suspects is unknown. However, surveillance video or a still image can be available from the location in which the crime was committed. According to the U.S. Department of Justice, released prisoners with the highest re-arrest rates were robbers (70.2%), burglars (74.0%), larcenists (74.6%), motor vehicle thieves (78.8%), those in prison for possessing or selling stolen property (77.4%) and those in prison for possessing, using or selling illegal weapons (70.2%). The system 200 can enable surveillance video or still images to be uploaded for facial recognition analysis. If suspect identification can be confirmed, then an electronic report can be generated that contains when the suspect was last in-custody, the percentage of identification accuracy, biographical information, as well as other images stored in the database 214.

The system 200 can help authenticate program attendance and instructor access. One or more cameras 102 can be located near classrooms and areas designated to education. The system 200 can cross reference offender movements against outstanding out of cell movements to ensure that inmates are attending the intended class or seminar. Using machine learning, this unauthorized access feature can extend to staff accountability by notifying supervisors if there no officer 107 properly escorting an inmate to a classroom or designated area for education.

Cameras 102 located at the entrance of classrooms can authenticate the instructor assigned to each scheduled educational segment or program. The system 200 can flag instructors or other personnel that are detected to be wandering or entering the incorrect classrooms, or otherwise in an improper location. Correctional facility staff in a centralized control room or a mobile device of one or more nearest correctional staff members can be alerted of the improper location. This same authentication alert can extend to punctuality, such as to indicate when personnel who are expected to be present are not present. The system 200 can track instructor punctuality, based either on a predefined schedule or the arrival of the first inmate, and send weekly email notifications to supervisors of consistent punctuality issues among certain program instructors.

The system 200 can determine a staff member's presence in the vicinity of opposite-sex offenders 105, such as for prison rape elimination act (PREA) compliance automation. At present, 48 out of 50 states voluntarily comply with PREA, a federal law aimed to reduce inmate-on-inmate sexual harassment and assault, as well as staff-on-inmate sexual assault. This law requires correctional facilities to collect documentation acknowledging when correctional facility staff enter a housing unit of the opposite sex. The system 200 can determine staff identity via fixed or mobile cameras 102 coupled to the recognition software. An automated log entry can be generated when a staff member enters the housing unit of an offender 105 of the opposite sex, populating in a PREA report to be used for compliance purposes.

FIG. 4 illustrates a user interface 400, according to an example embodiment. User interface 106 can be substantially similar to user interface 400. The user interface 400 can include information such as the names 402 or unique IDs of respective offenders 105 in a secure facility. The user interface 400 can show a location 404 that an offender 105 was last detected and the date/time 406 of the last detection. The user interface 400 can show whether an offender 105 is in transit, such as by showing where the offender 105 is traveling from 408 and where the offender 105 is scheduled to travel to 410. Other information pertinent to the monitoring of offender movement can be displayed on the user interface 400.

Figure 5:
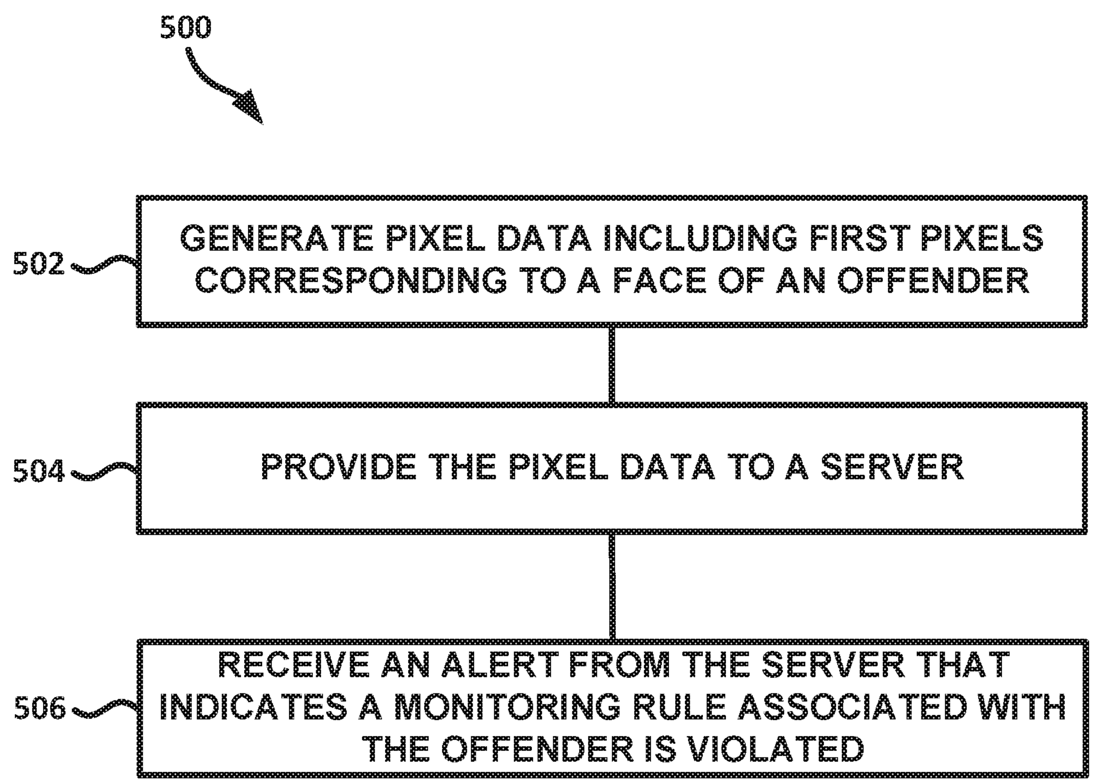
FIG. 5 illustrates a flow diagram of a technique for monitoring offender movement, according to an example embodiment.

FIG. 5 illustrates a flow diagram of a technique 500 for monitoring offender movement, according to an example embodiment. The technique 500 as illustrated includes generating (by cameras situated about a correctional facility) pixel data including first pixels corresponding to a face of a first offender in the correctional facility, at operation 502; providing (to a server) the pixel data from the cameras (through a network connection), at operation 504; and receiving (from the server) an alert that (based on facial recognition and location detection analysis performed on the pixel data by the server) indicates a monitoring rule associated with the first offender is violated.

The pixel data can include an environment around the first offender corresponding to a location within the field of view of the camera. The alert can further include an offender identification associated with the first offender, a location of the first offender in the correctional facility, or an indication of the monitoring rule violated. The technique 500 can further include, wherein the pixel data includes second pixels corresponding to a face of a second offender and the monitoring rule includes data identifying the first offender and the second offender and that the first offender and the second offender are not permitted to associate with each other.

The technique 500 can further include, wherein the monitoring rule includes data identifying a location that the first offender is not allowed to occupy, the location identified by an object in the pixel data or a location associated with the camera of the cameras that produced the pixel data. The technique 500 can further include, wherein the server determines a direction of the offender based on the pixel data and the monitoring rule indicates a path that the first offender is allowed to travel. The technique 500 can further include, wherein the pixel data indicates a time and the monitoring rule indicates a range of times in which the first offender is expected to be in the field of the view of respective cameras. The technique 500 can further include, wherein the pixel data includes third pixels corresponding to a face of an officer and wherein the monitoring rule indicates a gender of the first offender is different from a gender of the officer.

Figure 6:
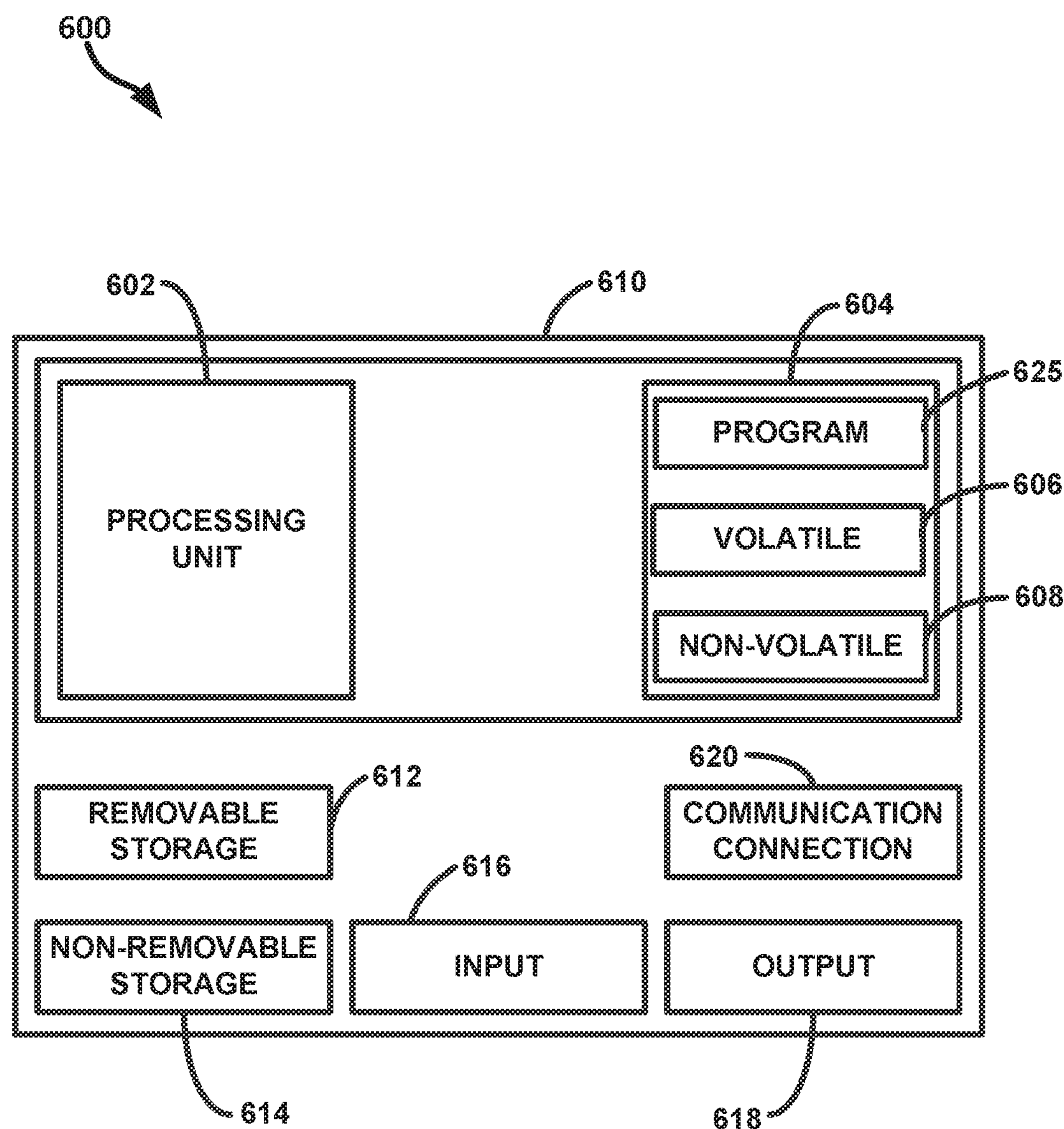
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 610, may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers, such as database servers. The remote computer may include a personal computer (PC), server, router, network PC, a peer device or other common network node, or the like. The communication connection may include a. Local Area Network (LAN), a Wide Area Network (WAN) or other networks.

Computer-readable instructions stored on a computer-readable medium are executable by the processing unit 602 of the computer 610. A hard drive, CD-ROM, and RAM are some examples of articles including a non-transitory computer-readable medium. For example, a computer program 625 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 610 to provide generic access controls in a COM based computer network system having multiple users and servers.

The functions or algorithms described herein are implemented in hardware, software, or a combination of software and hardware in some embodiments. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely embodiments. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flows are applicable to software, firmware, and hardware implementations.

Systems and methods of the present disclosure may be implemented on a mobile device as a mobile application, web-based application, on a desktop computer as a computer application, or a combination thereof. A mobile application may operate on a Smartphone, tablet computer, portable digital assistant (PDA), ruggedized mobile computer, or other mobile device. The mobile device may be connected to the Internet or network via Wi-Fi, Wide Area Network (WAN), cellular connection, WiMax, or any other type of wired or wireless method of networking connection. In some embodiments, a web-based application may be delivered as a software-as-a-service (SaaS) package (e.g. cloud-based embodiments) accessible via a device app, a web browser application, or other suitable application, depending on the particular embodiment.

Additional Notes and Some Example Embodiments

Example 1 includes a system comprising cameras situated about a correctional facility to generate pixel data including first pixels corresponding to a face of a first offender in the correctional facility and an environment around the first offender corresponding to a location within the field of view of the camera, and a server configured to receive the pixel data from the cameras through a network connection, transmit the received data to a recognition service through the network, and receive an alert from the alert service that, based on facial recognition and location detection analysis performed on the pixel data by the recognition service, indicates a monitoring rule associated with the first offender is violated, an offender identification associated with the first offender, a location of the first offender in the correctional facility, and an indication of the monitoring rule violated.

In Example 2, Example 1 further includes, wherein the pixel data includes second pixels corresponding to a face of a second offender and the monitoring rule includes data identifying the first offender and the second offender and that the first offender and the second offender are not permitted to associate with each other.

In Example 3, at least one of Examples 1-2 further includes, wherein the monitoring rule includes data identifying a location that the first offender is not allowed to occupy, the location identified by an object in the pixel data or a location associated with the camera of the cameras that produced the pixel data.

In Example 4, at least one of Examples 1-3 further includes, wherein the recognition service determines a direction of the offender based on the pixel data and the monitoring rule indicates a path that the first offender is allowed to travel.

In Example 5, Example 4 further includes, wherein the pixel data indicates a time and the monitoring rule indicates a range of times in which the first offender is expected to be in the field of the view of respective cameras.

In Example 6, at least one of Examples 1-5 further includes, wherein the pixel data includes third pixels corresponding to a face of an officer and wherein the monitoring rule indicates a gender of the first offender is different from a gender of the officer.

In Example 7, at least one of Examples 1-6 further includes, wherein the recognition service is to store the pixel data corresponding to the face of the first offender for future facial recognition of the first offender.

In Example 8, at least one of Examples 1-7 further includes, wherein the recognition service is to determine that the likelihood an entity is associated with the face is less than a threshold and the alert indicates that the entity is to be further verified by an officer.

In Example 9, at least one of Examples 1-8 further includes, wherein the recognition service is to perform a headcount of the number of offenders in the pixel data and the alert indicates one or more offenders not detected in the headcount.

Example 10 includes a method for inmate monitoring comprising generating, by cameras situated about a correctional facility, pixel data including first pixels corresponding to a face of a first offender in the correctional facility and an environment around the first offender corresponding to a location within the field of view of the camera, and providing, to a server, the pixel data from the cameras through a network connection, and receiving, from the server, an alert that, based on facial recognition and location detection analysis performed on the pixel data by the server, indicates a monitoring rule associated with the first offender is violated, an offender identification associated with the first offender, a location of the first offender in the correctional facility, and an indication of the monitoring rule violated.

In Example 11, Example 10 further includes, wherein the pixel data includes second pixels corresponding to a face of a second offender and the monitoring rule includes data identifying the first offender and the second offender and that the first offender and the second offender are not permitted to associate with each other.

In Example 12, at least one of Examples 10-11 further includes, wherein the monitoring rule includes data identifying a location that the first offender is not allowed to occupy, the location identified by an object in the pixel data or a location associated with the camera of the cameras that produced the pixel data.

In Example 13, at least one of Examples 10-12 further includes, wherein the server determines a direction of the offender based on the pixel data and the monitoring rule indicates a path that the first offender is allowed to travel.

In Example 14, Example 13 further includes, wherein the pixel data indicates a time and the monitoring rule indicates a range of times in which the first offender is expected to be in the field of the view of respective cameras.

In Example 15, at least one of Examples 10-15 further includes, wherein the pixel data includes third pixels corresponding to a face of an officer and wherein the monitoring rule indicates a gender of the first offender is different from a gender of the officer.

In Example 16, at least one of Examples 10-15 further includes, wherein the server is to store the pixel data corresponding to the face of the first offender for future facial recognition of the first offender.

In Example 17, at least one of Examples 10-16 further includes, wherein the server is to determine that the likelihood an entity is associated with the face is less than a threshold and the alert indicates that the entity is to be further verified by an officer.

In Example 18, at least one of Examples 10-17 further includes, wherein the server is to perform a headcount of the number of offenders in the pixel data and the alert indicates one or more offenders not detected in the headcount.

Example 19 includes a machine-readable medium including instructions that, when executed by a machine, cause the machine to perform the method of one of Examples 10-18.

Example 20 includes a system comprising a first network of a correctional facility to provide pixel data from cameras of the correctional facility, a second network including a database including a monitoring rule stored thereon that indicates a first offender at the correctional facility and a location or second offender that the first offender is restricted from in the correctional facility, and a server to receive the pixel data, and perform object recognition and/or facial recognition on the pixel data and identify the first offender and (1) the location of the first offender or (2) the second offender based on the pixel data and generate an alert to correctional facility personnel in response to detecting the monitoring rule is violated based on the identification.

In Example 21, Example 20 further includes, wherein the pixel data includes pixels corresponding to a distinct of the second offender and the monitoring rule includes data identifying the first offender and the second offender and that the first offender and the second offender are not permitted to associate with each other.

In Example 22, at least one of Examples 20-21 further includes, wherein the monitoring rule includes data identifying a location that the first offender is not allowed to occupy, the location identified by an object in the correctional facility or a location associated with the camera of the cameras that produced the pixel data.

In Example 23, at least one of Examples 20-22 further includes, wherein the server further determines a direction of the offender based on the pixel data and the monitoring rule indicates a path that the first offender is allowed to travel.

In Example 24, at least one of Examples 20-23 further includes, wherein the pixel data indicates a time and the monitoring rule indicates a range of times in which the first offender is expected to be in the field of the view of respective cameras.

In Example 25, at least one of Examples 20-24 further includes, wherein the pixel data includes pixels corresponding to a face of an officer and wherein the monitoring rule indicates a gender of the first offender is different from a gender of the officer.

In Example 26, at least one of Examples 20-25 further includes, wherein the server is to store pixel data in the database corresponding to the face of the first offender for future facial recognition of the first offender.

In Example 27, at least one of Examples 20-26 further includes, wherein the server is to determine that the likelihood an entity is associated with the face is less than a threshold and the alert indicates that the entity is to be further verified by an officer.

In Example 28, at least one of Examples 20-27 further includes, wherein the recognition service is to perform a headcount of the number of offenders in the pixel data and the alert indicates one or more offenders not detected in the headcount.

Example 29 includes a method of performing the operations of the system of at least one of Examples 20-28.

Example 30 includes a non-transitory machine-readable medium including instructions that, when executed by a machine, cause the machine to perform operations of the method of Example 29.

In this document, the terms “a” or “an” are used, as is common in patent documents, to include one or more than one, independent of any other instances or usages of “at least one” or “one or more.” In this document, the term “or” is used to refer to a nonexclusive or, such that “A or B” includes “A but not B,” “B but not A,” and “A and B,” unless otherwise indicated. In this document, the terms “including” and “in which” are used as the plain-English equivalents of the respective terms “comprising” and “wherein.” Also, in the following claims, the terms “including” and “comprising” are open-ended, that is, a system, device, article, composition, formulation, or process that includes elements in addition to those listed after such a term in a claim are still deemed to fall within the scope of that claim. Moreover, in the following claims, the terms “first,” “second,” and “third,” etc. are used merely as labels, and are not intended to impose numerical requirements on their objects.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system comprising:

cameras situated about a correctional facility to generate pixel data including first pixels corresponding to a face of a first offender in the correctional facility and an environment around the first offender corresponding to a location within the field of view of the camera;

a device through which a user defines progressive validation of a scheduled or non-scheduled movement of the first offender in the correctional facility, the progressive validation including data indicating an origin of the first offender, a destination of the first offender, a path from the origin to the destination the first offender is allowed to take, and a camera of the cameras between the origin and the destination and along the path that is to provide pixel data; and a server configured to receive the pixel data from the cameras through a network connection, transmit the received data to a recognition service through the network, and receive an alert from the alert service that, based on facial recognition and location detection analysis performed on the pixel data by the recognition service, indicates the progressive validation associated with the first offender is violated by the first offender not being detected by the camera, an offender identification associated with the first offender, a location of the first offender in the correctional facility, and an indication of the progressive validation definition violated.

2. The system of claim 1, wherein the pixel data includes second pixels corresponding to a face of a second offender and a monitoring rule includes data identifying the first offender and the second offender and that the first offender and the second offender are not permitted to associate with each other.

3. The system of claim 1, wherein the progressive validation includes data identifying a location that the first offender is not allowed to occupy, the location identified by an object in the pixel data or a location associated with the camera of the cameras that produced the pixel data.

4. The system of claim 1, wherein the recognition service determines a direction of the offender based on the pixel data and the progressive validation indicates a direction along the path that the first offender is allowed to travel.

5. The system of claim 4, wherein the pixel data indicates a time and the progressive validation indicates a range of times in which the first offender is to be in the field of the view of respective cameras of the origin, destination, and the camera between the origin and the destination.

6. The system of claim 1, wherein the progressive validation further includes data defining that the first offender is required to be in good standing to be allowed on the path without a correctional facility officer.

7. The system of claim 1, wherein the progressive validation further includes data defining that a correctional facility officer and the first offender are to be within a field of view of the camera at the origin simultaneously before the first offender is allowed to move towards the destination.

8. The system of claim 1, wherein the recognition service is to determine that the likelihood an entity is associated with the face is less than a threshold and the alert indicates that the entity is to be further verified by an officer.

9. The system of claim 5, wherein the camera between the origin and the destination is configured to only provide pixel data within a window of time after the offender has left the origin.

10. A method for inmate monitoring comprising:

generating, by cameras situated about a correctional facility, pixel data including first pixels corresponding to a face of a first offender in the correctional facility and an environment around the first offender corresponding to a location within the field of view of the camera; and providing, to a server, the pixel data from the cameras through a network connection;

providing data of a user-defined progressive validation of a scheduled or non-scheduled movement of the first offender in the correctional facility, the progressive validation including data indicating an origin of the first offender, a destination of the first offender, a path from the origin to the destination the first offender is allowed to take, and a camera of the cameras between the origin and the destination and along the path that is to provide pixel data; and receiving, from the server, an alert that, based on facial recognition and location detection analysis performed on the pixel data by the server, indicates the progressive validation associated with the first offender is violated, an offender identification associated with the first offender, a location of the first, offender in the correctional facility, and an indication of the progressive validation violated.

11. The method of claim 10, wherein the pixel data includes second pixels corresponding to a face of a second offender and a monitoring rule includes data identifying the first offender and the second offender and that the first offender and the second offender are not permitted to associate with each other.

12. The method of claim 10, wherein the progressive validation includes data identifying a location that the first offender is not allowed to occupy, the location identified by an object in the pixel data or a location associated with the camera of the cameras that produced the pixel data.

13. The method of claim 10, wherein the server determines a direction of the offender based on the pixel data and the progressive validation indicates a direction along the path that the first offender is allowed to travel.

14. The method of claim 13, wherein the pixel data indicates a time and the progressive validation indicates a range of times in which the first offender is expected to be in the field of the view of respective cameras at the origin, destination, and the camera between the origin the destination.

15. The method of claim 10, wherein the pixel data includes third pixels corresponding to a face of an officer and wherein a monitoring rule indicates a gender of the first offender is different from a gender of the officer.

16. A non-transitory machine-readable medium including instructions that, when executed by a machine, cause the machine to perform operations comprising:

generating pixel data including first pixels corresponding to a face of a first offender in the correctional facility and an environment around the first offender corresponding to a location within the field of view of the camera;

providing, to a server, the pixel data from the cameras through a network connection;

providing data of a user-defined progressive validation of a scheduled or non-scheduled movement of the first offender in the correctional facility, the progressive validation including data indicating an origin of the first offender, a destination of the first offender, a path from the origin to the destination the first offender is allowed to take, and a camera of the cameras between the origin and the destination and along the path that is to provide pixel data; and receiving, from the server, an alert that, based on facial recognition and location detection analysis performed on the pixel data by the server, indicates the progressive validation associated with the first offender is violated, an offender identification associated with the first offender, a location of the first offender in the correctional facility, and an indication of the progressive validation violated.

17. The non-transitory machine-readable medium of claim 16, wherein a monitoring rule includes data identifying a location that the first offender is not allowed to occupy, the location identified by an object in the pixel data or a location associated with the camera of the cameras that produced the pixel data.

18. The non-transitory machine-readable medium of claim 16, wherein the server determines a direction of the offender based on the pixel data and the progressive validation indicates a direction along the path that the first offender is allowed to travel.

19. The non-transitory machine-readable medium of claim 18, wherein the pixel data indicates a time and the progressive validation indicates a range of times in which the first offender is expected to be in the field of the view of respective cameras.

20. The non-transitory machine-readable medium of claim 16, wherein the pixel data includes third pixels corresponding to a face of an officer and wherein a monitoring rule indicates a gender of the first offender is different from a gender of the officer.

* * * * *